(12) United States Patent
Pierson et al.

(10) Patent No.: US 7,052,761 B2
(45) Date of Patent: May 30, 2006

(54) DIMENSIONALLY STABLE LAMINATE WITH REMOVABLE WEB CARRIER AND METHOD OF MANUFACTURE

(75) Inventors: Robert Pierson, Akron, OH (US); Dale Onderak, Kent, OH (US); Mark Tennant, Cuyahoga Falls, OH (US); Ray Cull, Akron, OH (US)

(73) Assignee: Schneller, Inc., Kent, OH (US)

( * ) Notice: Subject to any disclaimer, the term of this patent is extended or adjusted under 35 U.S.C. 154(b) by 98 days.

(21) Appl. No.: 10/670,430

(22) Filed: Sep. 24, 2003

(65) Prior Publication Data

US 2004/0076828 A1    Apr. 22, 2004

Related U.S. Application Data

(60) Provisional application No. 60/413,429, filed on Sep. 24, 2002.

(51) Int. Cl.
*B32B 3/00* (2006.01)
*B29C 59/04* (2006.01)
*B28B 5/00* (2006.01)

(52) U.S. Cl. ............... 428/172; 428/202; 428/204; 428/207; 264/241; 156/209; 156/219; 156/247; 156/277

(58) Field of Classification Search ............ 428/41.8, 428/172, 202, 204, 207, 421, 423.3, 424.6, 428/425.1, 473.5, 475.2, 483, 515, 518, 542.2, 428/520, 514; 156/199, 209, 219, 231, 247, 156/277; 264/241

See application file for complete search history.

(56) References Cited

U.S. PATENT DOCUMENTS 3,551,283 A    12/1970    Isaacson (Continued)

FOREIGN PATENT DOCUMENTS

EP    1 241 206 A1    9/2002

OTHER PUBLICATIONS

"DuPont Tedlar PVF Film", Aug. 19, 2003, pp. 1-4, http://dupont.com/tedlar.

(Continued)

*Primary Examiner*—Donald J. Loney
(74) *Attorney, Agent, or Firm*—Roetzel & Andress

(57) ABSTRACT

A balanced dimensionally stable laminate uses a web carrier which is removably attached to a layer of the laminate during lamination and processing. The web carrier maintains dimensional stability of the layers of the laminate during lamination and processing and after removal of the web carrier. The web carrier is removed if at all only after the laminate is formed and processed. The bonding force of the web carrier with at least one of the polymers layer resists forces which would otherwise dimensionally distort the layers of the laminate or design features thereof during lamination, particularly in thermal roll-forming lamination. The layers of the laminate, which may include print and texture design features, remain dimensionally stable after removal of the web carrier. The web carrier can be removed at any time prior to or after final application of the laminate to a substrate.

50 Claims, 2 Drawing Sheets

U.S. PATENT DOCUMENTS

| | | |
|---|---|---|
| 4,420,527 A | 12/1983 | Conley |
| 4,456,639 A | 6/1984 | Drower et al. |
| 4,693,926 A * | 9/1987 | Kowalski et al. ............ 428/204 |
| 4,695,503 A | 9/1987 | Liu et al. |
| 4,701,369 A | 10/1987 | Duncan |
| 4,877,683 A | 10/1989 | Bragaw, Jr. et al. |
| 4,988,540 A | 1/1991 | Bragaw, Jr. et al. |
| 5,137,775 A | 8/1992 | Davis et al. |
| 5,284,693 A | 2/1994 | Spain et al. |
| 5,304,413 A | 4/1994 | Bloom et al. |
| 5,506,031 A | 4/1996 | Spain et al. |
| 5,518,786 A * | 5/1996 | Johnson et al. ............ 428/40.6 |
| 5,662,977 A | 9/1997 | Spain et al. |
| 5,897,735 A * | 4/1999 | Peskin ........................ 156/230 |
| 5,976,671 A | 11/1999 | Gleim |
| 6,548,431 B1 | 4/2003 | Bansal et al. |
| 2002/0058125 A1 | 5/2002 | Gerber |

OTHER PUBLICATIONS

"Tedlar SP Polyvinyl Fluoride Film—Laminating Guide", pp. 1-4.

"Tedlar SP Polyvinyl Fluoride Film—Thermoforming Guide", pp. 1-6.

"Tedlar SP Polyvinyl Fluoride Film—Product and Properties Guide", pp. 1-4.

"Tedlar SP Polyvinyl Fluoride Film—Highly Conformable Film for Aircraft Interiors", pp. 1-4.

\* cited by examiner

DIMENSIONALLY STABLE LAMINATE WITH REMOVABLE WEB CARRIER AND METHOD OF MANUFACTURE

RELATED APPLICATIONS

This application claims priority to a provisional U.S. application, Ser. No. 60/413,429, filed Sep. 24, 2002, entitled, DECORATIVE LAMINATE WITH IMPROVED PROCESSING AND TEXTURE RETENTION PROPERTIES.

FIELD OF THE INVENTION

The present invention pertains generally to laminate structures made with polymeric films and, more particularly, to polymeric film laminates with decorative features including textures and print patterns.

BACKGROUND OF THE INVENTION

Decorative and structural panels for architectural and transport vehicle applications commonly have a decorative laminate outer cover affixed to a substrate. Decorative laminates are typically constructed with an exterior surface that is either an embossed texture, print pattern or both aesthetic design features. The decorative laminate is then formed and adhered to an underlying structural substrate layer. Maintaining uniformity of the texture and print pattern design features of the decorative laminate throughout the manufacturing process is very important.

Generally, such laminates are constructed using multiple layers of various films laminated together under high temperature and pressure, and/or embossed (again at high temperature and pressure) at different stages in a continuous roll-forming manufacturing process. U.S. Pat. No. 5,976,671 discloses two conventional constructions of a decorative laminate. In the first construction, the decorative laminate possesses two layers: a first embossed layer that imparts surface release to the laminate and a second decorative layer that overlies the first. This decorative layer is typically either screen printed (i.e., multi-graphics) or integrally colored (i.e., internally pigmented). Generally, the single laminate includes a textured layer consisting of a thermo-setting or thermoplastic emboss resin overlayed with a decorative layer composed of a thin layer of pigmented thermo-plastic film.

Other prior art teaches a second type of construction for a decorative laminate with an embossed layer, a decorative layer, and at least one structural layer. Conventional methods for the manufacture of such laminates are limited by the properties of the materials used which impose limitations on the extent to which the combined layers can be heated, stretched and further processed in casting and roll-forming machinery without adversely affecting the dimensional stability of the final product.

Present materials and manufacturing techniques do not enable the manufacture of a non-reinforced laminate in a continuous lamination process which results in a laminate having low distortion or dimensional stability. Laminates have three basic dimensions which can be represented by reference to x, y, and z axes, where the z-axis represents the thickness of the laminate. In conventional laminates, permanent distortion occurs along the x or y axis, or both, when the laminate is heated and stretched in one or more directions as a result of forces applied in a mechanical lamination process such as roll-forming. As the laminate cools it retains such distortion. Further, decorative laminates manufactured with materials and manufacturing techniques currently known result in a laminate, which when applied to a substrate under heat and vacuum, transmits defects in the substrate and loses texture retention. Therefore, a need exists for a laminate producible from materials with the desired aesthetic properties of texture and graphical features, and which does not distort or deform dimensionally in a roll-forming manufacturing process.

Some polymer films which are used as layers in laminates are provided with a pre-applied layer bonded directly to the polymer film by one of several conventionally known methods such as solution casting. In laminating and roll-forming techniques used in the art, films with no or low-orientation have relatively high elongation and shrinkage at temperatures required for embossing, which makes creating a laminate product in a continuous roll difficult. It is standard practice in the art to remove carrier layers prior to lamination of the polymer film to any other layer in a roll forming process, primarily so that the carrier does not interfere with the processing, e.g., bonding and texturing, of the polymer film. Removal of the carrier however, allows the film to deform or distort in multiple dimensions, particularly when the laminate is mechanically processed. Distortion is magnified by additional layers in the laminate.

SUMMARY OF THE INVENTION

The present invention provides a novel laminate structure and method of manufacture which utilizes a removable web carrier which remains on one or more of the polymer films of a laminate of two or more polymer films as the films are laminated together, for example in a continuous roll-forming process. The invention uses a web carrier which is selected to balance with the physical properties of the other layers of the laminate product, wherein the web carrier is removably attached or bonded to at least one of the layers of the laminate, and thereby provides the laminate resistance to distortion which can otherwise occur during lamination as a result of heat and mechanical strain. Conversely, the invention includes the selection of laminate layers to balance with physical properties of a removable web carrier to minimize distortion of the laminate layers when laminated and/or processed with the web carrier attached. Laminates of the invention have improved texture retention properties and dimensionally stable print patterns as the result of force balancing with a removable web carrier.

The invention involves the selection of layers of a laminate, including at least one layer which is attached to or mated with a web carrier, such that when the layers are laminated together and/or embossed, the bonding force of the web carrier is sufficient to resist distortion of any of the layers of the end laminate product during and after lamination and other processing.

In accordance with one general aspect of the invention, there is provided a laminate structure which has a first polymer film, a web carrier attached to a first side of the first polymer film, a second polymer film positioned parallel to and adjacent to a second side of the first polymer film, wherein a bonding force of the web carrier with the first polymer film overcomes forces which tend to distort the first and second polymer films during lamination, and the laminate of the first and second polymer films maintains dimensional stability after removal of the web carrier.

In accordance another general aspect of the invention, a laminate includes a first polymer film, a second polymer film positioned in a plane parallel to and on one side of the first polymer film, a web carrier positioned in a plane parallel to the first and second polymer films and removably attached to another side of the first polymer film, the first and second polymer films being laminated together, wherein the laminated first and second polymer films are free from distortion after lamination as a result of the removable attachment of the web carrier to the first polymer film, the web carrier being removable from the first polymer film without distortion of the end laminate.

The invention further provides a low distortion laminate produced by a process comprising the steps of providing a first polymer film, positioning a second polymer film in a plane parallel to and on a first side of the first polymer film, removably attaching a web carrier to one of the first or second polymer films, laminating the first and second polymers films, and removing the web carrier without distortion of the laminated first and second polymer films. Print and embossing resin layers may be added to the laminate, for example between the polymer film layers, without inducing distortion during or after the lamination process.

In accordance with another general aspect of the present invention, there is provided a dimensionally stable laminate product having a first polymer film, a second polymer film positioned in a plane parallel to and on one side of the first polymer film, and a web carrier positioned in a plane parallel to the first and second polymer films and removably attached to another side of the first polymer film, the first and second polymer films laminated together, the laminated first and second polymer films being free from distortion relative to dimensions of the first and second polymer films prior to lamination as a result of the removable attachment of the web carrier to the one side of the first polymer film, the web carrier being removable from the laminated first and second polymer films which remain free from distortion of dimensions, print or texture features after removal of the web carrier from the laminate. A texture can be applied to the laminate through the web carrier prior to removal of the web carrier. A second web carrier can be used in contact with the second polymer film.

These and other aspects of the invention are herein described in detail, with reference to the accompanying drawings and Examples, which are representative of some of the preferred and alternative ways in which the concepts of the invention may be practiced.

BRIEF DESCRIPTIONS OF THE FIGURES

DETAILED DESCRIPTIONS OF PREFERRED AND ALTERNATE EMBODIMENTS

Figure 1:
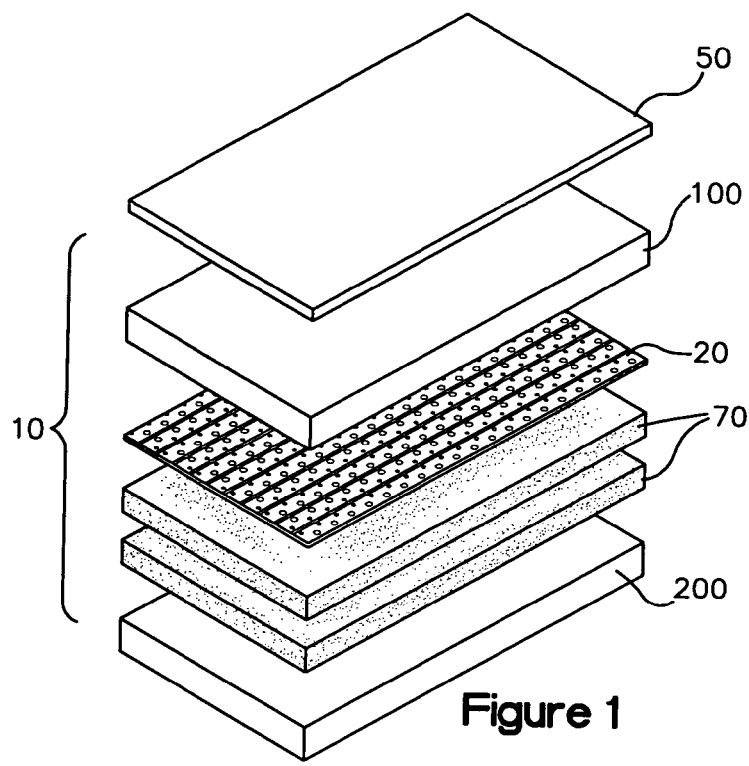
FIG. 1 is a schematic illustration of a laminate structure in accordance with the present invention.

FIG. 1 schematically illustrates a laminated structure, indicated generally at 10, which includes a first layer 100 which is preferably a polymer film, which may be any material suitable for construction of a laminate, and preferably a polymeric film (also referred to herein as a polymer film) such as for example polyvinyl fluoride (PVF), polyvinylidene fluoride, acrylic, polycarbonate, polyvinyl chloride, PETG, urethane, ABS or polyester. A preferred commercially available polymer film for the first layer 100 is a polyvinyl fluoride film sold as Tedlar® PVF film, manufactured by E.I. du Pont de Nemours of Wilmington, Del., and more preferably Tedlar SP PVF which is cast on to a polyester web carrier, and which provides excellent conformability, color stability, chemical resistance, thermoformability and durability.

A second layer 200, which is also preferably a polymer film of the same or different material than first layer 100, lies in a plane adjacent and parallel to first layer 100. Additional layers may be combined with first and second layers 100, 200, in any compatible number or combination, and with varying thickness, densities, material properties or other variables. For decorative structural products such as panels, a print or print layer 20 is provided proximate to first polymer film 100 as shown, or alternatively proximate to second polymer film 200. The bond of the web carrier to one of the first or second polymer films, or to both, maintains dimensional stability of the polymer films and any print pattern applied thereto, thereby avoiding any distortion of the print as might otherwise result from stresses at the interface of the laminate layers.

Intermediate layers 70 are provided between layers 100, 200 preferably in the form of an embossing resin or other suitable material, which provides additional thickness to the laminate 10, and which accepts an embossed texture applied through layer 100, as further described herein.

At an outer surface layer of the laminate 10, a web carrier layer 50 (referred to herein generally as a "web carrier") is provided, which is bonded, cast or otherwise attached to one side of either the first layer 100 or the second layer 200 or both, opposite the interfacing sides of the first and second layers 100, 200. As noted, the web carrier 50 as an outer layer of the laminate 10 can be located on the first layer 100 only, the second layer 200 only, or on both the first and second layers 100, 200. As used herein, the terms "first", "second", "top", "bottom" are used for descriptive reference only and are not to be construed as limiting the laminate 10 or any of its layers to any particular orientation or arrangement.

The material of the first and second polymer film layers may be polyvinyl fluoride (PVF), polyvinylidene fluoride, polyvinyl chloride, acrylic, polyester, polycarbonate, PETG, urethane, ABS or other suitable fluorinated materials or alloys thereof. A presently most preferred material for a polymer film with a removably attached web carrier to serve as the first or second layer 100, 200 with a web carrier 50 is Type 8 Tedlar® SP PVF film which is cast on to a polymer sheet which serves as a web carrier in the present invention. In accordance with the invention, the web carrier 50 is left on the accompanying layer 100, 200 during and throughout lamination and other processing of the laminate 10, including embossing and/or printing, and removed if at all from the finished laminate 10 upon completion of lamination and processing, or after final installation of the laminate to thereby serve as a protective mask, as further described herein.

The web carrier 50 can be any suitable material which can be removable bonded to one or both of the first, second layers 100, 200, and wherein the removable bond between the web carrier and at least one of the first or second layers 100, 200 is sufficient to maintain dimensional stability of the laminate structure formed by lamination of the first and second layers 100, 200 and any intermediate layers 70. In the case of Tedlar SP polyvinyl fluoride film, a removable bond between the web carrier 50 and the first layer 100 is formed by casting the PVF film onto the web carrier and dried without orientation. However, other forms of attachment of a web carrier to one or both of the polymer films, such as for example by releasable adhesive, may be suitable provided the web carrier 50 can be removed after lamination or other processing of the polymer film in accordance with the invention. Examples of materials which may be suitable for use as the web carrier 50 include, without limitation, polyester, paper, rigid polymer films, polycarbonate or polyimide, or any other dimensionally stable material which can be removably bonded to one or both of the polymer film layers. As used herein, the term "dimensionally stable" refers to the property of a web carrier which does not distort or deform when adhered to one or more of the polymer films, and maintains its dimensions and the dimensions of the layers of a laminate to which it is attached within design parameters for the end use application of the laminate.

Intermediate layers 70 serve as an embossing layer or layers, applied or otherwise laminated to the first or second layers 100, 200 as shown. The embossing layer is any suitable thermoplastic or thermoset resin, cast, calendared or extruded, which functions to bond the first and second layers 100, 200 internal to laminate 10, and provides a depth dimension to the laminate 10 which accepts and retains an embossed texture.

The laminate 10 is designed to be balanced in the sense that stresses induced in the layers 100, 200, and through intermediate layers 70 during lamination and texture/printing processing do not overcome the dimensional stability which the bond of the web carrier to at least one of layers 100, 200 provides. This results in the finished laminate 10 having dimensional stability with respect to any applied texture or print pattern. The balancing of forces between the layers 100 and 200, and the bond of the web carrier 50 with one or both of these layers, is achieved by selection of materials based primarily on thickness and orientation, such that lamination processing does not produce forces which exceed the dimensional stability provided by the bond of the web carrier 50 to one or both of layers 100, 200. The thickness and bonding force of the web carrier 50 are also selected or varied to balance the forces acting on layers 100, 200 during lamination processing to achieve a dimensionally stable laminate 10.

Figure 2:
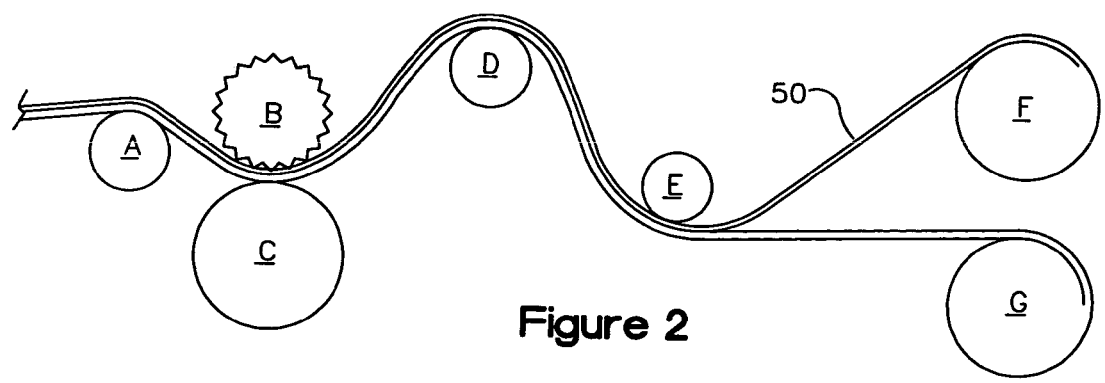
FIG. 2 is a schematic illustration of a roll-forming lamination process which can be used to construct a laminate in accordance with the present invention.

The web carrier 50 holds the high distortion film in place during manufacture and processing of the laminate 10, as shown in FIG. 2. This allows for better texture retention because higher temperatures can be utilized during processing without stretching or distortion of the laminate. It also allows geometric prints on a continuous basis because the print is not distorted during processing. It has been discovered by the inventors that it is preferable to utilize a layer in the laminate construction during the manufacturing process that was removable from the laminate without affecting the physical characteristic of the laminate after lamination and/or embossing. A web carrier, which is attached to one of the polymer films, e.g. by solution casting, melt casting or roller application of the polymer to the web carrier, will not adversely affect the texture, pattern or other aesthetic quality of the laminate, and will not cause distortion, wrinkling or dimensional skewing of the laminate. In a preferred embodiment, graphics or other decoration are applied to the laminate construction by laminating a film or printing art to the Tedlar SP opposite the web carrier side.

Figure 5:
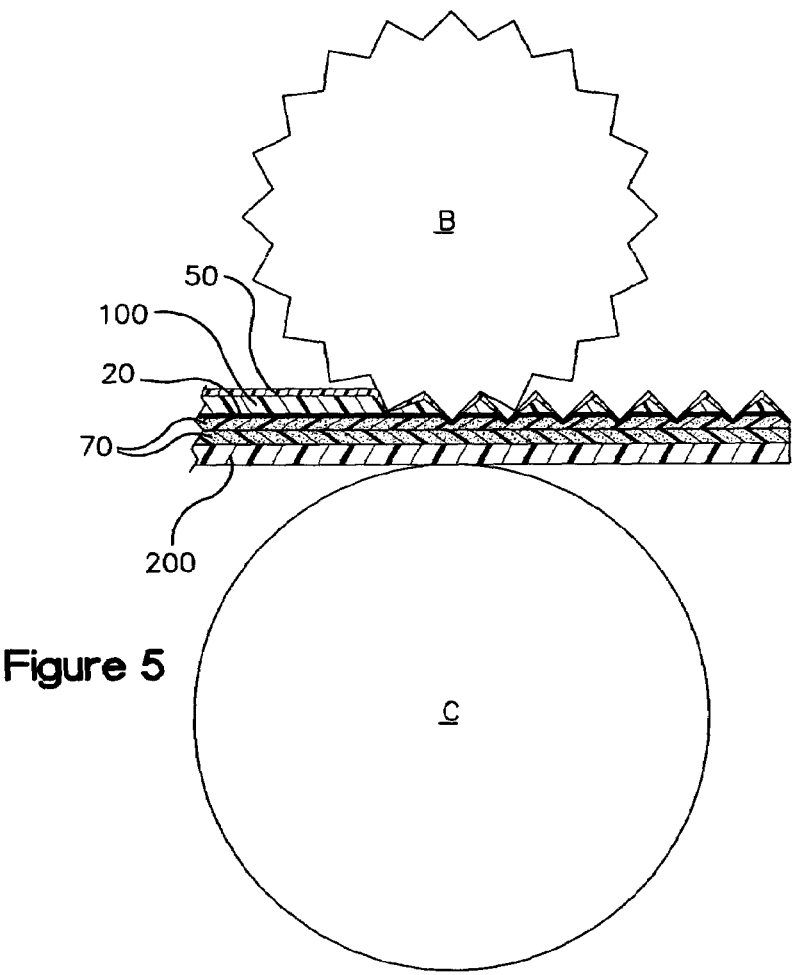
FIG. 5 is a schematic illustration of an embossing process which can be used in accordance with the present invention.

FIG. 2 illustrates a roll-forming type lamination process by which a dimensionally stable laminate 10 of the invention is made, wherein the combined layers 50, 100, 20, 70, 200, and any additional layers are fed from the left side against a first roller A into an embossing roller combination B and C, with the embossing roller B imparting a texture to the laminate through the web carrier 50 and first layer 100, into the embossing resin 70, as shown in cross-sectional detail in FIG. 5. The laminate 10 then proceeds over rollers D and E, after which the web carrier 50 is removed on to spooling roller F, with the finished laminate 10 being loaded on to roller G. This illustrates how, in a continuous laminate production process, the web carrier 50 remains an integral part of the laminate throughout permanent bonding of the layers and texturization, and is then removed prior to loading the finished laminate on to a delivery roller. The presence and bonding force of the web carrier to the laminate throughout the process causes the finished laminate to be dimensionally stable. The web carrier 50 can be left on the laminate 10 as a protective mask until or after final application of the laminate 10 to a substrate.

Tests of texture retention, formability, and print distortion, and other standard tests were performed on a laminates 10 made by the manufacturing processes of the invention. For texture retention at 280° F., the laminate showed a change in the 60 degree gloss of less than 5 gloss units (compared prior art laminates without a polymeric film cast on to a low distortion carrier is 10 gloss units). For thermoformability, the laminate 10 had a 3 inch draw in less than 5 inch vacuum at 212° F. (compared to prior art laminates with a 3 inch draw in 8 inch vacuum at 212° F.). For print distortion, the product has less than 2% uniform distortion, which is substantially less than prior art laminates which have non-uniform distortion.

Figure 3:
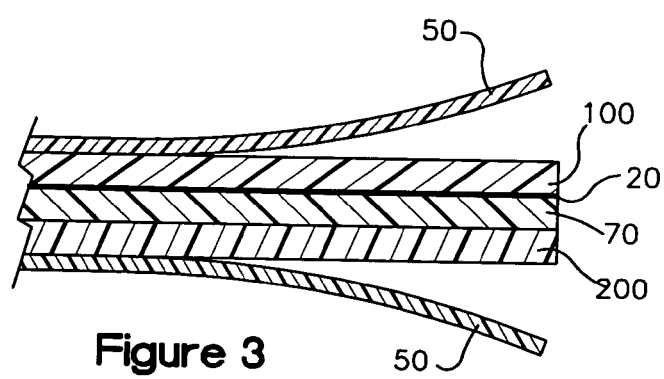
FIG. 3 is a schematic illustration of an alternate embodiment of a laminate structure in accordance with the present invention.

FIG. 3 illustrates removal of the web carrier 50, from one or both sides of the laminate 10, irrespective of the particular production process used.

Figures 4A, 4B:
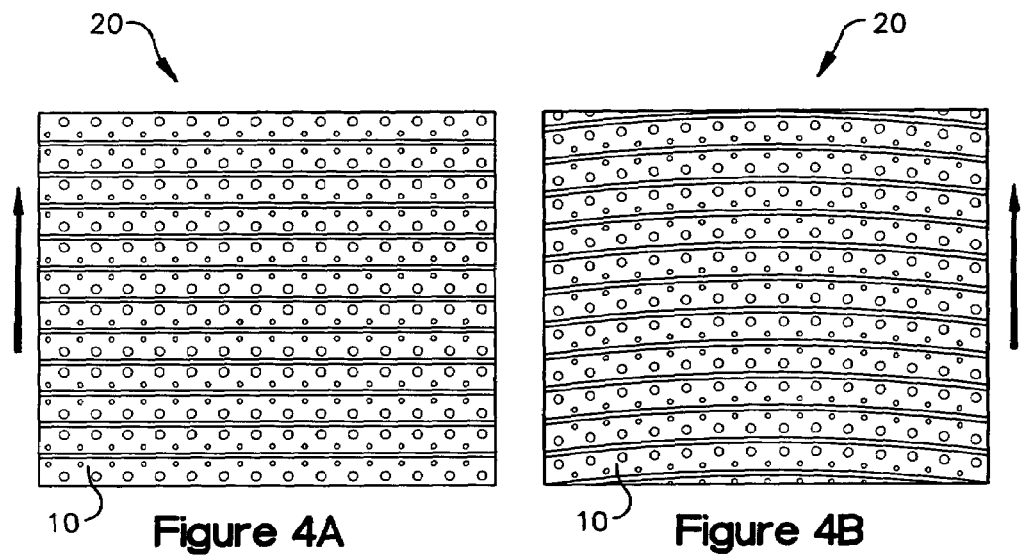
FIGS. 4A and 4B are schematic illustrations of a geometric pattern on a layer of a laminate structure.

FIG. 4A illustrates an overhead view of a finished laminate 10 of the invention made with an attached web carrier as described, and which has a visible print pattern of print layer 20 as part of the laminate structure as described, showing the dimensional stability of the pattern with respect to the x and y axes, with the vertical arrow on the left indicating the direction of travel of the laminate through roll-forming machinery. The print pattern P remains dimensionally stable due to the fact that the bonding force of the web carrier with one of the polymer films is sufficient to resist forces which would otherwise distort one or more layers of the laminate during lamination or texture processing. FIG. 4B illustrates a laminate with a print pattern P which is distorted, i.e., not dimensionally stable, due to elongation generally along the y axis in the direction of roll-forming machine travel as indicated by the arrow on the right. The distorted print pattern is a result of unbalanced forces between layers of the laminate caused by heat-induced shrinkage and mechanical strain which exceeds the strength of the bonding force between the layers, and the absence of an attached web carrier which maintains the layers in dimensionally stable alignment, as in the laminate of FIG. 4A.

The following examples of dimensionally stable laminates made with an attached web carrier are provided as further disclosure of preferred and alternate embodiments and do not otherwise limit the scope of the invention.

EXAMPLE 1

In this example, a 1 mil polyester carrier layer 50 and first layer 100 are provided in the combined form of Tedlar SP, Type 8, and laminated with 4 mils of embossing resin, and a 2 mil layer of Type 5 Tedlar.
- a. polyester web carrier, 1 mil
- b. 0.5 mil polyvinylflouride, non-oriented film solution cast on to web carrier, e.g. Type 8, Tedlar SP;
- c. print layer (optional)
- c. 4 mil embossing resin;
- d. 2 mil polyvinylflouride, back ply film, e.g. Type 5 Tedlar;
- e. substrate application adhesive (optional), e.g. heat-activated or pressure-sensitive.

This laminate is produced with a pre-coating of embossing resin, e.g. 1–2 mils, followed by lamination to a printed Tedlar SP film layer and to another layer of embossing resin, 1–2 mils, and to a back ply layer of Tedlar Type 5, e.g., 2.0 mils. The laminate is embossed through the Tedlar SP layer with the web carrier attached and into the embossing resin. The laminate can be coated with a substrate application adhesive, which is heat activated or pressure sensitive. The web carrier can be stripped from the Tedlar SP layer after lamination, or after final application to a substrate to thereby serve as a protective mask during shipping, handling and final application.

EXAMPLE 2

A relatively lighter weight dimensionally stable laminate is made with Tedlar SP as a face ply, a 2 mil thick layer of embossing resin, and a formable 2 mil thick back ply.
- a. web carrier, e.g. 1 mil polyester;
- b. 0.5 mil polyvinylflouride, non-oriented film solution cast on to web carrier, e.g. Type 8, Tedlar SP;
- c. print layer or layers (optional);
- d. embossing resin, 2 mils;
- e. back ply film, 2 mils, Type 5 Tedlar;
- f. substrate attachment adhesive (optional).

This laminate is produced with a pre-coating of embossing resin, e.g. 1.0 mils, followed by lamination to a printed Tedlar SP film layer and to another layer of embossing resin, and to a back ply layer of Tedlar Type 5, e.g., 2.0 mils. The laminate structure is embossed through the Tedlar SP layer with the web carrier attached and into the embossing resin. The laminate can be coated with a substrate application adhesive, which is heat activated or pressure sensitive. The web carrier can be stripped from the Tedlar SP layer after lamination, or after final application to a substrate to thereby serve as a protective mask during shipping, handling and final application.

EXAMPLE 3

A dimensionally stable laminate with a screen printed design and which may also be textured.
- a. web carrier;
- b. 0.5 mil polyvinylflouride, non-oriented film solution cast on to web carrier, e.g. Type 8, Tedlar SP;
- c. print layer or layers, geometric or linear;
- d. embossing resin (e.g. 2.0 mils);
- e. embossing resin (e.g. 2.0 mils);
- f. back ply film, e.g. Tedlar (2.0 mils);
- g. substrate application adhesive (optional).

This laminate is produced with a pre-coating of embossing resin, e.g. 1–2 mils, followed by screen printing a geometric or linear print either on the embossing resin or on the back of the SP Tedlar layer, laminating the embossing resin layers, and laminating to a back ply layer of Tedlar Type 5, e.g., 2.0 mils. The laminate structure is embossed through the Tedlar SP layer with the web carrier and into the embossing resin. The laminate can be coated with a substrate application adhesive, heat activated or pressure sensitive. The web carrier can be stripped from the Tedlar SP layer after lamination, or after final application to a substrate to thereby serve as a protective mask during shipping, handling and final application.

EXAMPLE 4

A printed dimensionally stable laminate with a print design applied by a rotary or gravure printing process, and which may also be textured by embossing, with a web carrier on a face ply or top layer of the laminate, which may be removed when the laminate structure is completed.
- a. web carrier;
- b. 0.5 mil polyvinylflouride, non-oriented film solution cast on to web carrier, e.g. Type 8, Tedlar SP;
- c. print layer or layers, rotary or gravure;
- d. embossing resin (2.0 mils);
- e. embossing resin (2.0 mils);
- f. film back ply (e.g. Tedlar Type 5, 2.0 mils);
- g. substrate application adhesive.

This laminate is formed with an initial 2.0 mil thick embossing layer. The Tedlar SP layer is printed with the desired print design by rotary or gravure printing processes as known in the art. The printed Tedlar SP layer is then laminated to the embossing resin layers, and to the back ply layer, Tedlar Type 5. The laminate is embossed through the face ply Tedlar SP layer and the web carrier thereon, into the embossing resin layers. The laminate is coated with a substrate application adhesive. The web carrier is stripped off of the Tedlar SP layer after lamination, or after final application of the laminate to a substrate, to thereby serve as a protective mask.

EXAMPLE 5

A colored dimensionally stable laminate made with colored vinyl and a protective polymer film cover.
- a. web carrier, 1 mil;
- b. 0.5 mil polyvinylflouride, non-oriented film solution cast on to web carrier, e.g. Type 8, Tedlar SP;
- c. colored vinyl, e.g. 14–16 mil;
- d. substrate application adhesive.

The Tedlar SP and vinyl layers are laminated and embossed under pressure and heat, and a substrate application adhesive applied to the vinyl layer. The web carrier is stripped off after lamination or at any time prior to or after final application of the laminate to a substrate to thereby serve as a protective mask.

EXAMPLE 6

A dimensionally stable printed and textured laminate made with two strippable web carriers, one of polyester and one of paper, and an acrylic resin back ply.
- a. polyester web carrier, 1 mil;
- b. 0.5 mil polyvinylflouride, non-oriented film solution cast on to web carrier, e.g. Type 8, Tedlar SP;
- c. one or more print layers;
- d. embossing resin, 2–4 mils;

e. acrylic film, 2 mils;

f. paper web carrier, e.g. 5 mils.

This laminate is produced with a pre-coating of embossing resin, e.g. 1–2 mils, followed by lamination to a printed Tedlar SP film layer and to another layer of embossing resin, 1–2 mils, and to a back ply of acrylic resin precoated onto a 2 mil polyester web carrier. The laminate structure is embossed through the Tedlar SP layer with the web carrier and into the embossing resin. The web carrier is removed from the back of the acrylic layer and the laminate can be coated with a substrate application adhesive, heat activated or pressure sensitive. The web carrier can be stripped from the Tedlar SP layer after lamination, or after final application to a substrate to thereby serve as a protective mask during shipping, handling and final application.

EXAMPLE 7

A dimensionally stable printed and textured laminate made with the web carrier adhesively bonded to the back of the laminate.

a. 0.5 mil polyvinylflouride, non-oriented film solution cast on to web carrier, e.g. Type 8, Tedlar SP;

b. print layer or layers, c. embossing resin (2.0 mils);

d. embossing resin (2.0 mils);

e. film back ply (e.g. Tedlar Type 3, 2.0 mils);

f. thermoplastic adhesive that does not distort laminate during removal of web carrier g. paper web carrier, e.g. 5 mils.

This laminate is formed with the embossing layers cast and laminated onto the back film ply Tedlar which has a paper web carrier attached to it with a thermoplastic adhesive. The printed Tedlar SP layer is then laminated to the embossing resin layers, and to the back ply layer, and paper web carrier. The SP web carrier can be removed or stay on for the embossing operation. The laminate is embossed through the face ply Tedlar SP layer, into the embossing resin layers. The paper is removed from the laminate after embossing and an optional substrate adhesive is applied.

These illustrative examples are representative of just a few of the many embodiments of the laminates and methods of laminate manufacture of the invention, each having the common characteristic of a removable web carrier on at least one of the layers during formation of the laminate, which can be removed once the laminate is completed, the bonding force of the carrier providing dimensional stability to the laminate as a whole and resisting forces between the layers of the laminate which would otherwise cause distortion of the laminate dimensions and any print patterns on any of the layers.

As noted, the principles of the invention apply equally to the selection of the web carrier or carriers, and to the selection of layers of the laminate with consideration for balancing distortion relative to the web carrier, so that the end product laminate remains within design tolerances.

What is claimed as the invention is:

1. A dimensionally stable thermoformable laminate produced by continuous lamination without distortion of any layers of the laminate, the laminate comprising:

a first polymer film having a first side and a second side;

a dimensionally stable web carrier removably attached to a side of the first polymer film, the web carrier having a bonding force with the first polymer film to provide dimensional stability to the laminate for lamination and embossing;

a print layer on an opposite side of the first polymer film, the print layer having a print pattern;

a second polymer film proximate to the print layer;

the first and second polymer films being laminated together;

a texture from the embossing which extends through the web carrier into one of the first or second polymer films and which is retained by one of the first or second polymer films after thermoforming;

the print pattern being substantially free from distortion after lamination and embossing as a result of removable attachment of the web carrier to the first polymer film, the web carrier being removable from the first polymer film without distortion of the print pattern, the bonding force of the web carrier sufficient to prevent deformation of the first or second polymer films and distortion of the print pattern.

2. The laminate of claim 1 wherein the web carrier is made of a material selected from a group of materials of: polyester, glass, fabric, paper, rigid polymer films, polycarbonate or polyimide, or any other dimensionally stable material which can be removably bonded to one or both of the polymer film layers.

3. The laminate of claim 1 wherein the first and second polymer films are made of one or more materials selected from the group of: polyvinyl fluoride, polyvinylidene fluoride, polyvinyl chloride, acrylic, polyester, polycarbonate, PETG, urethane, ABS, thermoplastic materials or alloys thereof.

4. The laminate of claim 1 further comprising one or more layers of embossing resin between the first and second polymer films.

5. The laminate of claim 4 wherein:

the first polymer film has a thickness in a range of about 0.1 mil to 10 mils;

the embossing resin has an aggregate thickness in a range of about 0.5 mil to 40 mils; and the second polymer film has a thickness in a range of 0.5 mil to 40 mils.

6. The laminate of claim 1 wherein the web carrier is bonded to the laminate with a bonding force sufficient to maintain dimensionally stability of the laminate during processing of the laminate.

7. The laminate of claim 1 thermally formed as a decorative cover on a structural product.

8. The laminate of claim 4 further comprising at least one layer in addition to the first and second polymer films, web carrier and embossing layer.

9. The laminate of claim 4 further comprising a texture which extends through the web carrier and first polymer layer and into the embossing resin.

10. The laminate of claim 1 further comprising a texture which extends through the web carrier and into the first and second polymer layers of the laminate.

11. The laminate product of claim 1 further comprising an additional removably attachable web carrier attached to one of the polymer films so that each of the first and second polymer films has a removably attached web carrier.

12. A laminate product comprising:

a first polymer film; and, a second polymer film positioned in a plane parallel to and on a first side of the first polymer film, the first and second polymer films laminated together by continuous roll-forming lamination;

a print pattern on one of the first or second polymer films;

a polyester web carrier removably attached to one side of the first or second polymer film, and an embossed texture which extends through the web carrier and into the first or second polymer films;

the print pattern being free from distortion after lamination as a result of removable attachment of the web carrier to one of the polymer films during lamination, and the web carrier being removable from the laminated first or second polymer films without distortion of the print pattern.

13. The laminate product of claim 12 wherein the first and second polymer films are made of any material selected from the group of: polyvinyl fluoride, polyvinylidene fluoride, polyvinyl chloride, acrylic, polyester, polycarbonate, PETG, urethane or ABS.

14. The laminate product of claim 12 further comprising one or more layers of embossing resin between the first and second polymer films.

15. The laminate product of claim 14 in which the first polymer film has a thickness in a range of about 0.1 mil to 10 mils;

the embossing resin has an aggregate thickness in a range of about 0.5 mil to 40 mils, and the second polymer film has a thickness in a range of about 0.5 mil to 40 mils.

16. The laminate product of claim 12 further comprising an additional removably attachable web carrier attached to one of the polymer films so that each of the first and second polymer films has a removably attached web carrier.

17. A dimensionally stable laminate product comprising:
a first polymer film;
a web carrier removably attached to one side of the first polymer film;
a second polymer film on a side of the first polymer film opposite the web carrier;
the first and second polymers films laminated together in a continuous roll-forming operation and an embossed texture which extends through the web carrier and into the first polymer film;
the laminated first and second polymer films being dimensionally stable relative to dimensions of the first and second polymer films prior to lamination as a result of the removable attachment of the web carrier to the first polymer film, and
the laminated first and second polymer films being dimensionally stable after removal of the web carrier.

18. The dimensionally stable laminate product of claim 17 wherein the first polymer film is cast on to the web carrier.

19. The dimensionally stable laminate product of claim 17 wherein the web carrier is made of polyester.

20. The dimensionally stable laminate product of claim 17 wherein the first and second polymer films are made of one or more materials selected from the group of: polyvinyl fluoride, polyvinylidene fluoride, polyvinyl chloride, acrylic, polyester, polycarbonate, PETG, urethane, ABS or other suitable fluorinated materials or alloys thereof.

21. The dimensionally stable laminate product of claim 17 further comprising a print pattern proximate to the first or second polymer film, wherein the print remains free from distortion alter removal of the web carrier.

22. The dimensionally stable laminate product of claim 17 further comprising a second web carrier removably attached to the second polymer film.

23. The dimensionally stable laminate product of claim 22 wherein the second web carrier is made of a material selected from the group of: polyester, paper, rigid polymer films, polycarbonate or polyimide, or any other dimensionally stable material which can be removably bonded to one or both of the polymer film layers.

24. The dimensionally stable laminate product of claim 17 further comprising one or more layers of embossing resin between the first and second polymer films.

25. The dimensionally stable laminate product of claim 17 wherein the first polymer film has a thickness in a range of about 0.1 mil to 10 mils, and the second polymer film has a thickness in a range of about 0.5 mil to 40 mils.

26. The dimensionally stable laminate product of claim 23 wherein the embossing resin layer or layers has a thickness in the range of 0.5 mil to 40 mils.

27. The dimensionally stable laminate product of claim 24 wherein the embossed texture extends through the web carrier and into the first polymer film and the embossing resin.

28. The dimensionally stable laminate product of claim 17 further comprising a substrate attachment adhesive on the second polymer film.

29. The dimensionally stable laminate product of claim 17 attached to a substrate.

30. The dimensionally stable laminate product of claim 17 further comprising a print layer between the first and second polymer films, the print layer being dimensionally stable as a result of the removable attachment of the web carrier to the first polymer film.

31. A method of making a dimensionally stable decorative laminate which has a print pattern with dimensions which remain substantially the same prior to and after lamination of layers of the laminate by continuous roll-forming lamination, the method comprising the steps of:
providing a first polymer layer with an attached web carrier;
providing a second polymer layer;
providing a print pattern between the first polymer layer and the second polymer layer;
laminating the first and second polymer layers together by continuous roll-forming lamination,
forming a texture to the first polymer layer by embossing through the web carrier into the first or second polymer layers, and
removing the web carrier from the first polymer layer after the first and second polymer layers have been laminated together.

32. The method of claim 31 wherein the print pattern is applied to the first polymer layer opposite the web carrier.

33. The method of claim 31 further comprising the step of providing a separate print layer which bears the print pattern and which is positioned between the first and second polymer layers.

34. The method of claim 31 further comprising the step of providing embossing resin between the first and second polymer layers.

35. The method of claim 31 further comprising the step of casting the first polymer layer on to the web carrier prior to lamination of the first and second polymer layers.

36. The method of claim 31 further comprising the step of providing a second web carrier removably attached to the second polymer layer.

37. The method of claim 31 further comprising the step of applying a substrate attachment adhesive to the second polymer layer.

38. The method of claim 31 further comprising the step of imparting a texture to the laminate by embossing through the second polymer layer.

39. A dimensionally stable laminate producible by continuous lamination without distortion of any layers of the laminate, the laminate comprising:
a first polymer filling having a first side and a second side;
a dimensionally stable web carrier removably attached to a side of the first polymer film the web carrier having a bonding force with the first polymer film to provide dimensional stability to the laminate for lamination and embossing;
a second polymer film proximate to the first polymer film;
the first and second polymer films being laminated together;
a texture from the embossing which extends through the web carrier into one of the first or second polymer films and which is retained by one of the first or second polymer films after thermoforming;
the laminate being substantially free from distortion after lamination and embossing as a result of removable attachment of the web carrier to the first polymer film, the web carrier being removable from the first polymer film without distortion of the first or second polymer films of the laminate, the bonding force of the web carrier sufficient to prevent deformation of the first or second polymer films and distortion of the laminate.

40. The laminate of claim 39 wherein the first polymer film is cast on to the web carrier.

41. The laminate of claim 39 wherein the web carrier is made of a material selected from a group of materials of: polyester, glass, fabric, paper, rigid polymer films, polycarbonate or polyimide, or any other dimensionally stable material which can be removably bonded to one or both of the polymer film layers.

42. The laminate of claim 39 wherein the first and second polymer films are made of one or more materials selected from the group of: polyvinyl fluoride, polyvinylidene fluoride, polyvinyl chloride, acrylic, polyester, polycarbonate, PETG, urethane, ABS thermoplastic materials or alloys thereof.

43. The laminate of claim 39 further comprising one or more layers of embossing resin between the first and second polymer films.

44. The laminate of claim 43 wherein:
the first polymer film has a thickness in a range of about 0.1 mil to 10 mils;
the embossing resin has an aggregate thickness in a range of about 0.5 mil to 40 mils; and
the second polymer film has a thickness in a range of 0.5 mil to 40 mils.

45. The laminate of claim 39 wherein the web carrier is bonded to the laminate with a bonding force sufficient to maintain dimensionally stability of the laminate during processing of the laminate.

46. The laminate of claim 39 thermally formed as a decorative cover on a structural product.

47. The laminate of claim 43 further comprising at least one layer in addition to the first and second polymer films, web carrier and embossing layer.

48. The laminate of claim 39 further comprising a texture which extends through the web carrier and first polymer layer and into the embossing resin.

49. The laminate of claim 39 further comprising a texture which extends through the web carrier and into the first and second polymer layers of the laminate.

50. The laminate product of claim 39 further comprising an additional removably attachable web carrier attached to one of the polymer films so that each of the first and second polymer films has a removably attached web carrier.

* * * * *